UNITED STATES PATENT OFFICE.

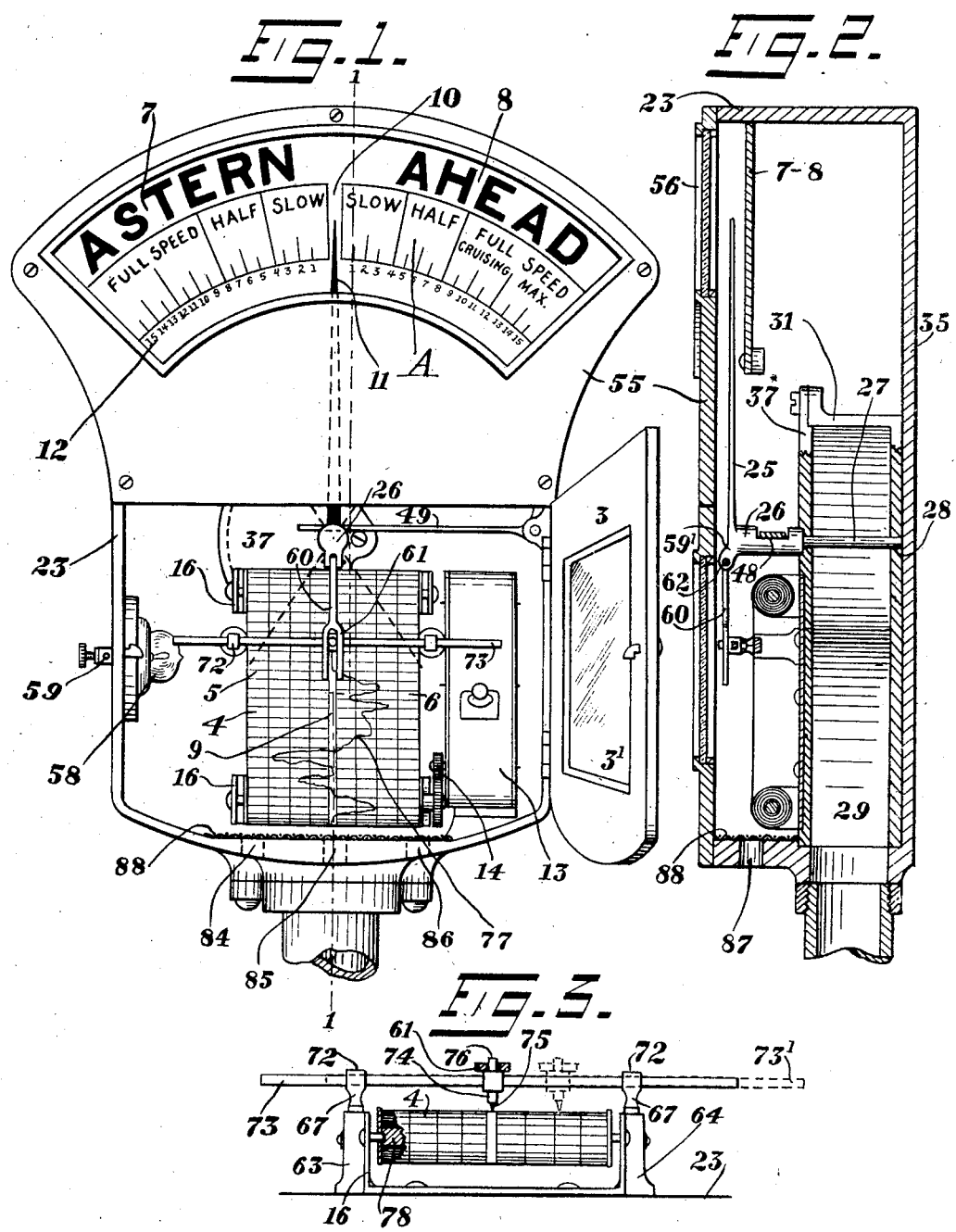

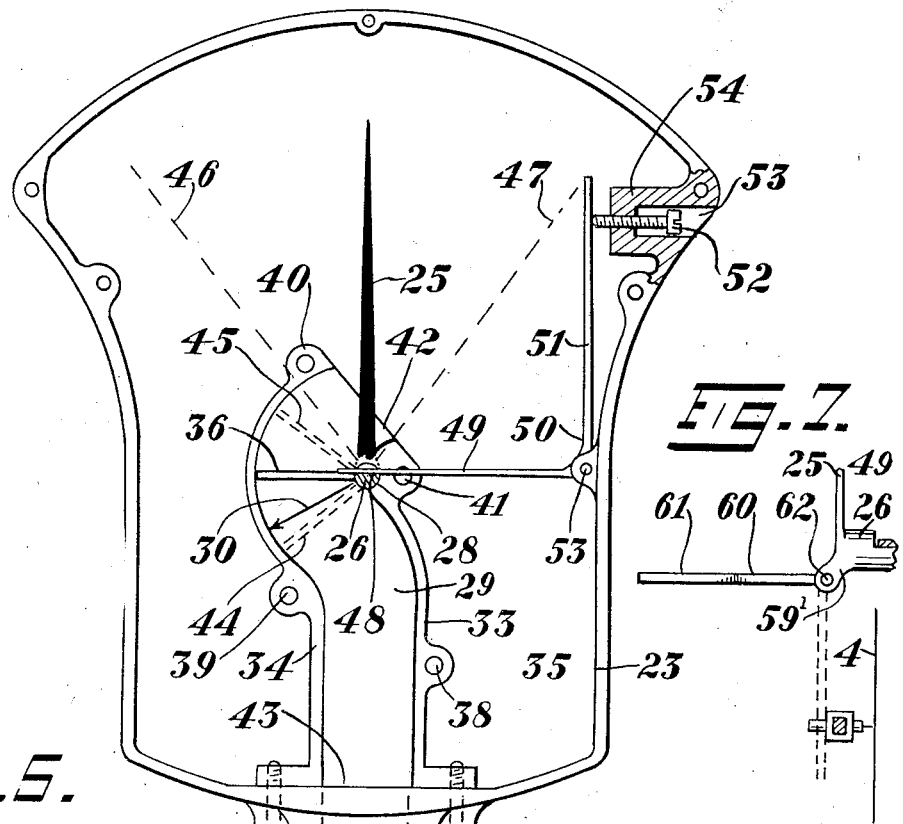
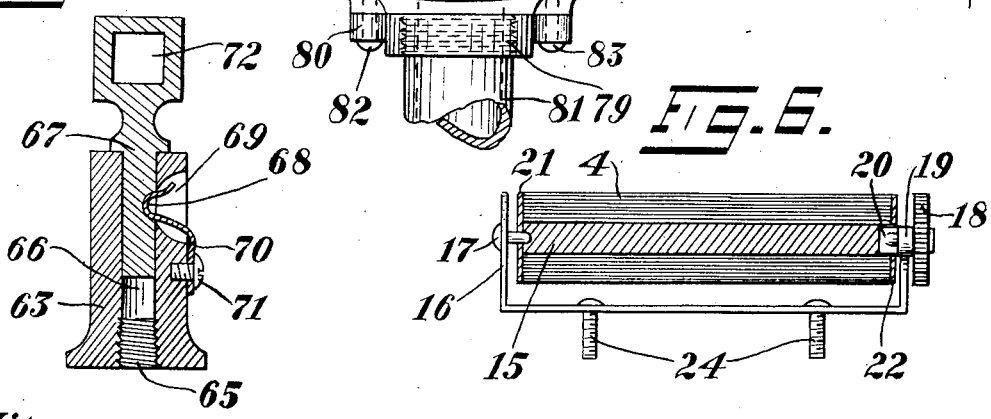

CHARLES H. KENNEY, OF NEW LONDON, CONNECTICUT, ASSIGNOR, BY MESNE ASSIGNMENTS, TO THE AMERICAN SPEED INDICATOR COMPANY, OF NEW LONDON, CONNECTICUT, A CORPORATION OF CONNECTICUT.

MARINE SPEEDOMETER.

1,077,533.  Specification of Letters Patent.  Patented Nov. 4, 1913.

Application filed June 23, 1911. Serial No. 634,881.

*To all whom it may concern:*

Be it known that I, CHARLES H. KENNEY, a citizen of the United States, residing in New London, in the county of New London and State of Connecticut, have invented certain new and useful Improvements in Marine Speedometers, of which the following is a specification.

My present invention relates to a recording marine speedometer and provides a simple and practical means for visibly and promptly indicating the forward or reverse movement of power propelled vessels.

I am aware that devices of this character have been used for the purpose to which I apply my device, but being operated electrically they are subject to more or less trouble through broken circuits and delicacy of the electrically actuated indicating mechanism.

One improvement is the combination therewith of a recording apparatus of a well known type whereby the relative speeds and movements, ahead or astern, of the vessels will be recorded, showing not only the kind of speed but also the relative length of time such speed was maintained.

My device is so constructed that by the application of a suitable reversible air pump, which may be driven by some operative part of the propulsion machinery of a vessel, as for example the propeller shaft, it is obvious that if the propeller shaft is run in either direction for the purpose of propelling the vessel, the pump will be caused to operate in like manner, causing a pressure when run in forward direction or a suction when operated in the reverse direction.

It is merely necessary, in my construction, to have a single pipe running from one port of the pump to the indicator, which may be attached at any suitable point on the vessel, and the said indicator will be operated to show the various forward or reverse speeds, according to the rotation of the engine.

A further advantage in my device is an adjusting means, whereby I am enabled to increase the load or tension on the needle in the indicator for the purpose of regulating the pneumatically operated means to any required resistance against pressure or suction and to accommodate the said pneumatically operated means to the force of suction or pressure that may be exerted upon said means when located at various distances from the air pump.

It is obvious that an indicator connected some distance away from the pump will require more pressure or suction, due to friction losses and the greater volume of air to be acted upon before the needle is caused to operate, than would be the case of an indicator coupled close up or in a near vicinity to the said pump. It is to compensate for the varying distances above mentioned that I have provided the said tension devices and by the proper adjusting of the same I am enabled to overcome the differences due to internal friction and other losses, to cause the needles in a plurality of indicators, positioned in various parts of a vessel, to synchronize, and to adjust them so that the fluctuations of all of said needles will correctly indicate, simultaneously, any given speed of the vessel. It will be further seen that this adjusting device will not only accommodate the needle to varying conditions in the way of friction losses of the actuating fluid, and varying conditions of suction and pressure, but also may be regulated to suit the varying number of revolutions of the different propeller shafts to which they may be attached when the speeds of the vessels are alike.

In the accompanying drawings Figure 1 is a front view of my device. Fig. 2 is a sectional view taken on line 1—1, Fig. 1. Fig. 3 is a fragmentary view taken on line 2—2, Fig. 1, showing a part of the recording apparatus. Fig. 4 is a front view of my device with the cover and recording mechanism removed. Fig. 5 is an enlarged view showing the details of the supporting post for the recorder marker. Fig. 6 is an enlarged view of the roll for carrying the record. Fig. 7 is a detail of the shaft, pointer and marker-lever, showing the latter disengaged from the marker.

In Fig. 1 the front door 3 is shown as having a glass plate 3' set therein, and is open exposing the record tape 4 which may be of paper or the like and with the proper ordinates and abscissas drawn thereon, said tape being divided into two zones 5 and 6 by a dividing space 9 and corresponding with the upper halves 7 and 8 of the indicator dial, generally denoted by A marked "astern" and "ahead."

The dial A, which may be made of celluloid or like material, is arranged to be held between the front edge of the housing 23 and the cover-plate 55, which cover-plate has therein a sight or opening 56. The cover-plate is held in position by a plurality of screws or other suitable fastenings, thereby pinching the said dial against the housing and holding the same in normal position.

A dividing neutral space 10 where the needle 11 rests when the vessel is not in motion also divides the visible indicator dial 7—8. The main portion 7 of the indicator dial has directly beneath it four divisions as has also portion 8, giving the varying terms in speeds, such as "slow," "half," and "full speed"; "full speed" being further subdivided into "cruising" and "maximum." These before mentioned spaces are again subdivided by shorter lines and may have set opposite them a series of numbers indicating the nautical knots or miles per hour, as at 12.

The record tape 4 is arranged to be carried on two rolls for feeding the same during the motion of the vessel and is driven by a suitable mechanism, preferably a clock mechanism, inclosed in a housing 13, the power therefrom being transmitted by means of a series of gears 14 to the lower roll 15, which is shown in Fig. 6 slightly enlarged and in section and as having a flexible supporting frame 16, said frame having a fixed pivot 17 engaging one end of the said roll 15 and having at its other end one of the gears 18 of the series 14, said gear being rotatably fixed in the bearing 19 and having an id portion 20 which engages in a central bore arranged to suitably receive said portion 20. A portion of the tape 4 is shown rolled thereon and being held by flanges 21 and 22; this entire structure being held in position on the back wall of the housing 23 by means of screws 24.

The needle member 25, Figs. 2 and 4, is arranged upon a rotatably mounted shaft 26, and an extension portion 27 of said shaft is rotatably mounted in a curved or radial bore 28 in the air duct 29. The center of said bore 28 is the exact center from which the arc 30 is formed and this air duct is of substantially rectangular formation, as shown at 31 in Fig. 2, and is composed of two side walls 33 and 34, integrally arranged on the back wall 35 of the casing 23 and is adapted to be machined on the three internal surfaces formed thereby to obtain an accurately machined passage for the reception of the close-fitting, pneumatically operated, blade member 36 which is fixed to the portion of the shaft 27, and oscillates the same.

The front plate 37, which conforms to the outside contour of the duct 29 and its walls 33 and 34, is held in proper place by means of screws, provision for said screws being indicated at 38, 39, 40, and 41, extends from the upper portion of the duct 42 to the lower portion 43 covering the entire length of the duct and making it substantially air-tight.

The blade member 36, which is mounted on the indicator needle shaft 27, is caused to move to position 44 by suction and to position 45 by pressure, thereby causing the needle to oscillate from position 46 to position 47, according to the suction or pressure which is created by the alternate rotations of the engines. Any intermediate positions of the said blade 36 are naturally effected by the speed of the engine which affects the amount of suction or pressure caused by the pumps; consequently, any intermediate speeds between said positions 44 and 45, which are the maximum positions, that are constantly maintained, will hold the needle in that position, thus indicating the relative speed of the vessel.

In order to return the needle 25 to its normal position 11 when not effected by pneumatic forces or when the vessel is at anchor, a portion of the shaft 26 is flatted; as at 48, said flatted portion forming a seat for one arm 49 of a right-angled spring member 50, the other arm 51 being in engagement with an adjustable screw 52, the member 50 being pivoted as at 53 to the wall of the housing 23. This flatted portion 48 is arranged at a right angle to the needle and it is obvious that when the needle is oscillated in one direction or another by pneumatic force the frame 49 of the spring member 50 acts as a counter-force in the opposite direction and thereby brings the needle back to the vertical or neutral position 10, upon the stopping of the pneumatic forces, which is directly caused by the stoppage of the vessel.

The before mentioned adjusting member 52 is preferably housed in a bore 53 formed in the interior of the housing 23 in a lug or boss 54, for the purpose of preventing accidents and injury to the adjusting member 52, and also to make it inconvenient to tamper with the setting.

It is obvious from the foregoing that the tendency of the spring member 50 to maintain the needle 25 in a vertical position may be increased or decreased by the advancing or retracting of the adjusting member 52, thereby creating a greater or lesser resistance, as required, to adjust the needle to the pneumatic forces operating in the duct 29.

The dial 7—8 is mounted in a convenient manner near the front portion of the housing 23 at the upper end thereof, as indicated in Fig. 2, the front covered portion 55 having an aperture 56 suitably holding therein a glass partition thereby enabling one to see the dial and the movement of the needle.

For the purpose of illuminating the dial and the record tape at night, a small electric light 58 is mounted in the interior of the housing 23 at one side thereof with suitable means 59 for connecting the same to any convenient source of current. For the purpose of marking the speeds on the record tape 4, I have arranged an extension 59' on the needle shaft 26, said extension carrying an arm 60 having a fork 61 at its lower end and pivotally connected to the needle shaft 26 by a pin 62. This pivotal arrangement is for the purpose of swinging said operating arm 60 out of the way, as indicated in Fig. 7, for the purpose of renewing the record tape 4 when it shall have been used up and which will hereafter be more fully described. The marking apparatus, whereby the speeds are recorded upon the tape 4, is composed of a pair of upstanding posts 63 and 64 which may be integrally located upon the rear wall of the housing 23 or may be threaded or screwed to the same, as indicated by the thread at 65, Fig. 5, wherein is shown an enlarged view of one of the members 63, said posts having a bore 66 arranged to receive the shank of a stud 67 therein, said shank having a notch 68 cut therein which registers with an opening 69 arranged in the side wall members 63 and 64.

A suitably formed spring member 70 fixedly held by a screw 71 engages the notch 68 in the stud 67, so that said stud can be removed at will. The upper end of the stud 67 has arranged in it an aperture 72 whereby to receive a sliding shaft 73 and hold the same in parallel alinement with the record tape 4 at a suitable distance therefrom to properly maintain a fixed device 74 which is arranged to receive a marking point 75 therein at one side, and on its opposite side has a stud 76 arranged thereon, said stud being engaged by the fork portion 61 of the arm or lever 60.

Any oscillation of the needle 25 carries with it the arm 60, thus causing the shaft 73, which carries the marking device 75, to move correspondingly to and fro, as indicated by the dotted lines 73', thus causing a record line to be marked on tape 4. The tape 4 is caused to move at a suitable speed by means of the clock work in the housing 13, thereby causing indication of a character similar to the line 77, Fig. 1. When the tape 4 has been entirely filled it is removed by shifting the arm 60 upward and outward, as indicated in Fig. 7, leaving the bar 73 and its bearings 72 in the posts 63 and 64 free to be removed by pulling the same outwardly, causing the spring 68 to release its hold on the shanks of the studs 67.

By flexing the bearings carrying the lower roll 15 and the upper roll 78, which upper roll is mounted at both ends similarly to that previously described for roll 15 at 17, the spring supporting members 16 are thereupon free to receive a fresh roll of tape. The process for resetting the mechanism is the reverse to the above described method.

For the purpose of conducting the pneumatic pressures to and from the indicators I use ordinary iron pipe and at the point of connection, 79 of said piping, with the housing 23, any suitable means for attaching may be used, such as a gland 80 into which is threaded a pipe 81, said gland being attached by means of screws 82 and 83.

A series of holes 84, 85, 86, and 87, are provided at the bottom of the housing 23 to permit of the ingress or egress of air as required, and a piece of gauze 88, preferably of metal, is placed above the holes in the housing to prevent injury to the mechanism from matter that may be drawn into the housing, or by tampering.

Having thus described my invention, I claim:

1. A pneumatically operated speed and direction indicator, comprised of a housing, an open ended duct in said housing, a shaft in said duct extending into the said housing, a movable closure member fixedly attached to said shaft in said duct, a needle fixedly attached to said shaft in said housing, a portion thereof being flatted, a right-angled two-arm resilient member pivoted in said housing adjacent to said shaft, one arm of said resilient member resting in the flat in said shaft, adjusting means carried by said housing and arranged adjacent to the other arm of said resilient member whereby the resistance may be adjustably regulated to keep said needle vertical.

2. A pneumatically operated speed and direction indicator, comprised of a housing, an open ended duct in said housing, a shaft rotatably mounted in said duct, one end of which extends into the interior of said housing, a closure member fixedly mounted upon said shaft in said duct, a needle mounted upon the other end of said shaft in said housing, said shaft having a flat seat thereon, a right-angled tension member pivoted adjacent to said needle, tension adjusting means in said housing, one arm of said right-angled member being in connection with said adjusting means, the other arm of said right-angled member resting in said flat seat on said shaft, a dial in said housing divided into two sections, one section indicating a right hand motion of said needle, the other section indicating a left hand motion of said needle, said needle resting normally in a vertical position and traversing said right-hand side of said dial or said left hand side of said dial accordingly as the closure member in said duct is acted upon by either suction or pressure.

3. A pneumatic speed and direction indicator comprising a housing, a conduit having a curved portion, a shaft pivoted adjacent the curved portion of the conduit and provided with a flatted part, a closure fast on the shaft and arranged to be swung through said curved conduit portion by the air pressure in the conduit, a pointer carried by said shaft, a resilient member having a portion engaging the said flatted part of the shaft, and an adjusting member carried by the housing and engaging a portion of the resilient member to regulate the tension thereof.

CHARLES H. KENNEY.

Witnesses:
A. MITCHELL, Jr.,
ALLYN L. BROWN.

Copies of this patent may be obtained for five cents each, by addressing the "Commissioner of Patents, Washington, D. C."